US008960546B2

(12) United States Patent
Streater

(10) Patent No.: US 8,960,546 B2
(45) Date of Patent: Feb. 24, 2015

(54) EXTENDED RANGE EMF ANTENNA

(71) Applicant: National Oilwell Varco, L.P., Houston, TX (US)

(72) Inventor: Jessie Darrell Streater, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 14/045,221

(22) Filed: Oct. 3, 2013

(65) Prior Publication Data

US 2014/0091146 A1   Apr. 3, 2014

Related U.S. Application Data

(60) Provisional application No. 61/709,205, filed on Oct. 3, 2012.

(51) Int. Cl.
*G06K 19/00* (2006.01)
*G06K 7/10* (2006.01)
*H01Q 7/08* (2006.01)
*H01Q 1/22* (2006.01)

(52) U.S. Cl.
CPC .............. *G06K 7/10336* (2013.01); *H01Q 7/08* (2013.01); *G06K 7/10356* (2013.01); *H01Q 1/2216* (2013.01)
USPC ............................ 235/449; 235/435; 235/439

(58) Field of Classification Search
USPC .......................... 235/435, 439, 449, 487, 493
See application file for complete search history.

(56) References Cited

U.S. PATENT DOCUMENTS

| | | | |
|---|---|---|---|
| 5,149,946 A | * | 9/1992 | Jerome et al. ................. 235/439 |
| 6,897,827 B2 | | 5/2005 | Senba et al. |
| 7,511,679 B2 | | 3/2009 | Araki et al. |
| 7,540,428 B2 | | 6/2009 | Baba et al. |
| 7,905,418 B2 | | 3/2011 | Aslanidis et al. |
| 2009/0243785 A1 | | 10/2009 | Deicke et al. |
| 2010/0194541 A1 | | 8/2010 | Stevenson et al. |

OTHER PUBLICATIONS

Youbok Lee, "Antenna Circuit Design for RFID Applications," Microchip Technology Inc., AN710, 2003, DS00710C pp. 1-50.
Youbok Lee, "RFID Coil Design," Microchip Technology Inc., AN678, 1998, DS00678B pp. 1-19.

* cited by examiner

*Primary Examiner* — Matthew Mikels
(74) *Attorney, Agent, or Firm* — Conley Rose, P.C.

(57) ABSTRACT

An antenna for use in an asset-identification system. The antenna includes a plurality of electrically conductive coils electrically connected in parallel. The coils are physically aligned along a common axis. The coils are offset along the common axis by a distance selected to reduce the mutual inductance between the electrically conductive coils, while allowing the signals from the electrically conductive coils to add together.

20 Claims, 4 Drawing Sheets

EXTENDED RANGE EMF ANTENNA

CROSS-REFERENCE TO RELATED APPLICATION

The present application claims priority to U.S. Provisional Patent Application No. 61/709,205, filed on Oct. 3, 2012, entitled "Extended Range EMF Antenna," which is hereby incorporated herein by reference in its entirety.

BACKGROUND

1. Field of Invention

The present disclosure relates to antennas for transmitting/receiving electromagnetic field (EMF) signals.

2. Background

Rubee and RFID are two asset-identification technologies used to identify and track objects using tags embedded in or otherwise attached to the objects. Both of these technologies use antennas to wirelessly communicate with the tags and receive identification or other information therefrom. The electrical and physical configuration of the antennas is important since such configuration can affect the range and effectiveness with which the antennas can communicate with the tags.

Typically, antennas used by asset-identification systems use a single coil of conductive wire or multiple coils of conductive wire connected in series. The coils typically include a small number of turns to provide a desired inductance. Unfortunately, the small number of turns can significantly limit the antennas' ability to receive data. Most systems overcome this problem by transmitting more power through the antenna. This provides the tag more power to transmit its signal back to the antenna, and thus less sensitivity by the antenna to read the signal.

Another way to improve reception is by using an additional antenna. Unfortunately, an additional antenna requires space and can therefore significantly increase overall package size. For this reason, most systems use a single high power antenna for both transmitting and receiving data. With such antennas, the transmitting range is significantly larger than the reading range, creating an undesirable imbalance.

In view of the foregoing, what are needed are improved antennas for use in wireless asset-identification systems, such as Rubee/RFID asset-identification systems. Ideally, such antennas will be effective at both transmitting power and receiving data. Further needed are antennas with an improved receiving range compared to conventional antennas.

SUMMARY

Various problems and needs in the art that have not yet been fully solved by current antennas used in asset-identification systems. Accordingly, embodiments of the invention have been developed to provide improved antennas for use in asset-identification systems. The features and advantages of the various embodiments will become more fully apparent from the following description and appended claims.

Consistent with the foregoing, an improved antenna for use in an asset-identification system is disclosed herein. In one embodiment, an antenna includes a plurality of electrically conductive coils electrically connected in parallel. The coils are physically aligned along a common axis. The coils are offset along the common axis by a distance selected to reduce the mutual inductance between the electrically conductive coils, while allowing the signals from the electrically conductive coils to add together.

In another embodiment, an asset identification system includes a reader and an antenna. The reader is configured to extract identification information from a signal wireless received from a tag. The antenna is coupled to the reader, and is configured to transmit power signals to the tag and to receive the signal wirelessly transmitted by the tag responsive to the power signals. The antenna includes a first plurality of electrically conductive coils and an electrically-insulating, magnetically-conductive core. The first plurality of electrically conductive coils are electrically connected in parallel and physically aligned along a common axis. The electrically conductive coils are offset along the common axis by a distance selected to reduce the mutual inductance between the electrically conductive coils, while allowing the signals from the electrically conductive coils to add together. The first plurality of electrically conductive coils are wound about the electrically-insulating, magnetically-conductive core.

BRIEF DESCRIPTION OF THE DRAWINGS

For a detailed description of exemplary embodiments, reference will now be made to the accompanying drawings in which.

NOTATION AND NOMENCLATURE

Figure 1A:
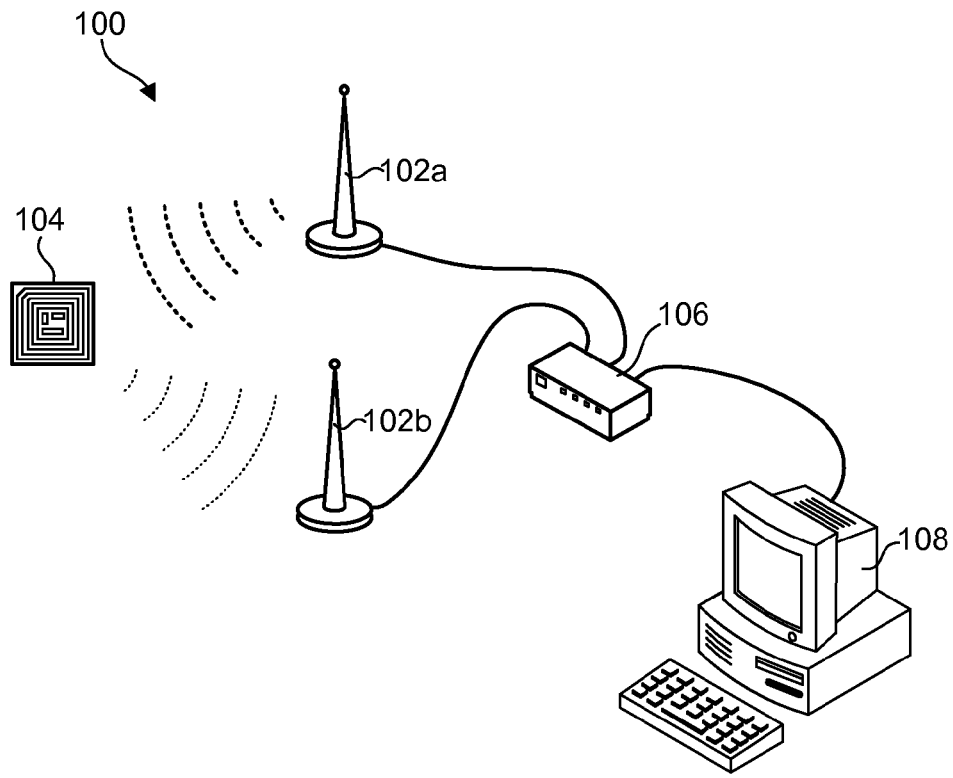
FIG. 1A is a diagram showing an embodiment of an asset-identification system using a first antenna for transmitting and a second antenna for reading.

Certain terms are used throughout the following description and claims to refer to particular system components. As one skilled in the art will appreciate, companies may refer to a component by different names. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

In the drawings and description that follow, like parts are typically marked throughout the specification and drawings with the same reference numerals. The drawing figures are not necessarily to scale. Certain features illustrated in the drawings may be shown exaggerated in scale or in somewhat schematic form, and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings and components of the embodiments discussed below may be employed separately or in any suitable combination to produce desired results.

Referring to FIG. 1A, one embodiment of an asset-identification system 100 is illustrated. The asset-identification system 100 shows one example of an environment in which an improved antenna in accordance with principles disclosed herein may be employed. Other examples of asset-identification systems 100 in which an improved antenna may be employed are shown in FIGS. 1B and 1C.

In the example illustrated in FIG. 1A, a first antenna 102a is configured to transmit a power signal, which is received by a tag 104 embedded in or attached to an object. Using the received power signal, the tag 104 powers up and emits a signal that contains identification or other desired information. A second antenna 102b, which may be optimized for detecting (i.e., reading) signals, detects the signal emitted by the tag 104 and relays the signal to a reader 106. The reader 106 may extract the information from the signal and relay the information to a computer 108 or other system 108. In one example, a computer 108 matches the information with a record of a particular object stored in a database. In this way, the computer 108 may keep track of particular objects or assets.

One advantage of the system 100 illustrated in FIG. 1A is that the antennas 102a, 102b may be optimized for different purposes. For example, the first antenna 102a may be optimized for transmitting power signals and the second antenna 102b may be optimized for reading signals transmitted by a tag 104.

Figure 1B:
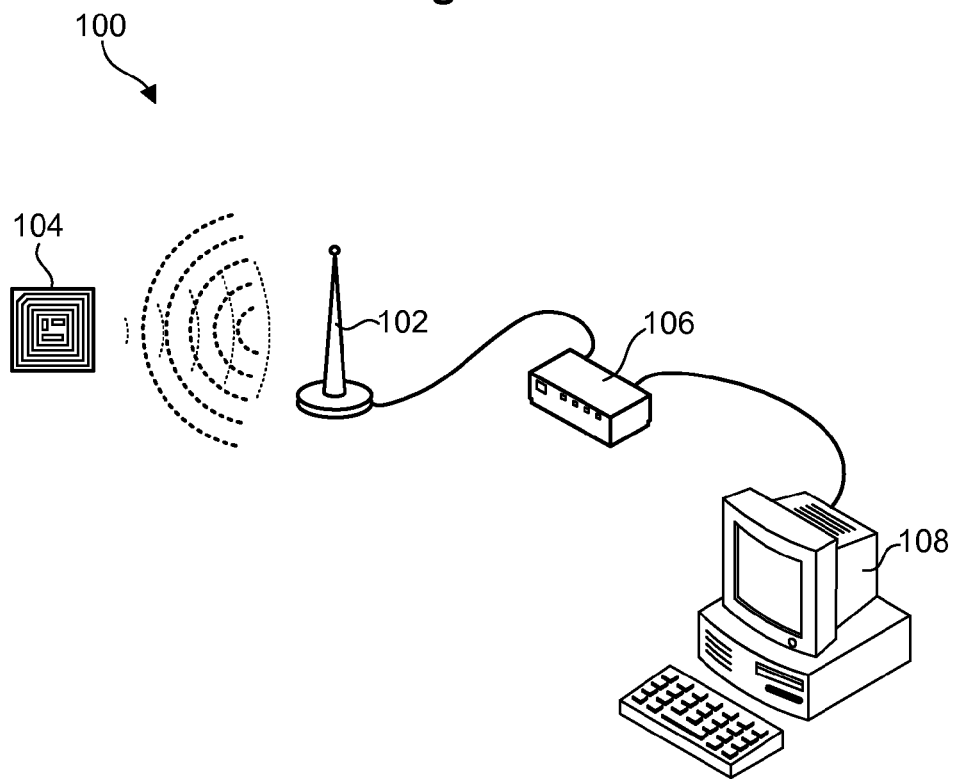
FIG. 1B is a diagram showing an embodiment of an asset-identification system using an antenna for both transmitting and reading.
Figure 1C:
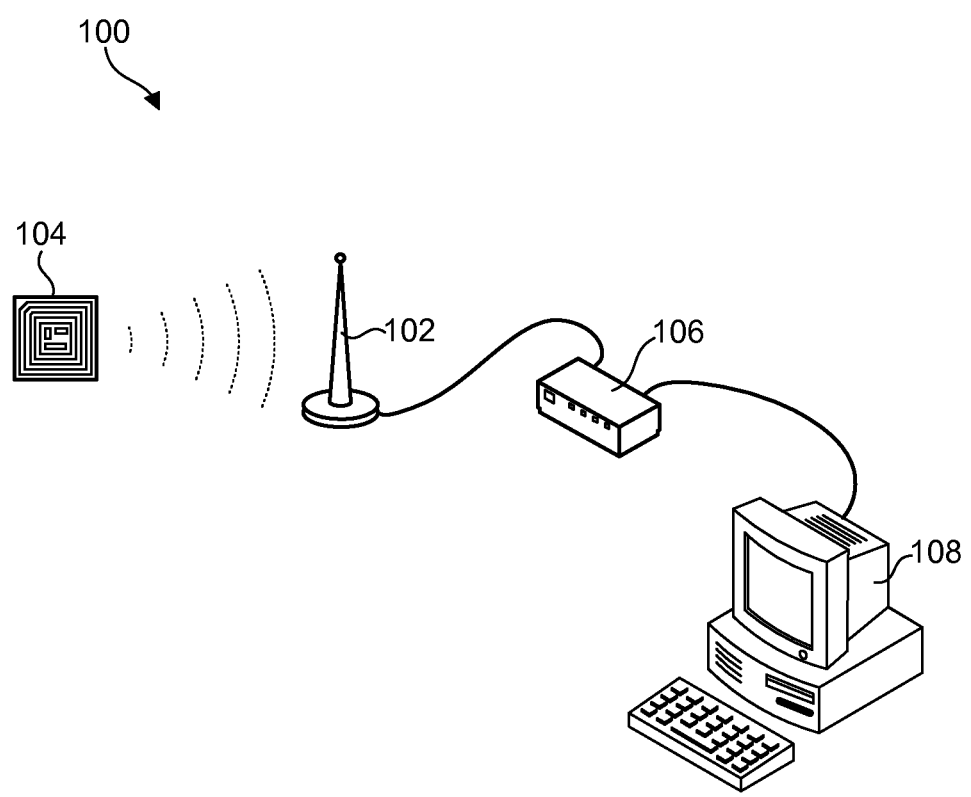
FIG. 1C is a diagram showing an embodiment of an asset-identification system using a battery-powered tag and an antenna for reading.

Referring to FIG. 1B, in another embodiment, an asset-identification system 100 utilizes a single antenna 102 for both transmitting and receiving signals. That is, the same antenna 102 may be used for both transmitting power to the tag 104, and receiving a response signal from the tag 104. The use of a single antenna 102 may reduce the package size although the antenna 102 may suffer from tradeoffs in terms of transmitting/reading optimization.

Referring to FIG. 1C, in yet another embodiment, a battery or other power source may be embedded in or included with a tag 104. Using this power source, the tag 104 may emit a signal containing identification or other information that may be detected by an antenna 102 and relayed to a reader 106.

The examples illustrated in FIGS. 1A through 1C are provided to show different environments in which an improved antenna in accordance with principles disclosed herein may be utilized. The environments are exemplary in nature and are not intended to be limiting. Other environments where the antenna may be useful are possible and within the scope of the disclosure.

Figure 2:
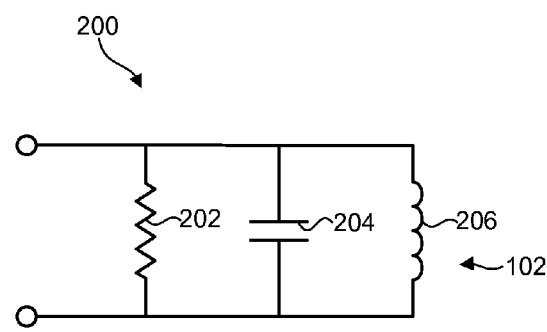
FIG. 2 is a schematic diagram showing one example of a resonant circuit.

Referring to FIG. 2, in asset-identification systems 100, an antenna 102 is one component of a resonant circuit 200. Typically, a resonant circuit 200 is composed of resistive components 202, capacitive components 204, and inductive components 206 (functioning as the antenna 102). The values associated with the components greatly affect the functionality of the circuit 200. The resistive, capacitive, and inductive values may be selected based on a desired frequency, bandwidth, and quality in accordance with the following equations:

$$\text{Frequency} = \frac{1}{2\pi\sqrt{LC}}$$

$$\text{Bandwidth} = \frac{1}{2\pi RC}$$

$$\text{Quality} = \frac{\text{Frequency}}{\text{Bandwidth}}$$

Once desired resistive, capacitive, and inductive values have been determined, there are a number of ways to build an antenna 102 to provide a desired inductance. For example, an antenna 102 may be constructed using a single coil, multiple coils in series, multiple coils in parallel, or a combination of coils in parallel and series configurations.

The inductance of a coil is directly related to the number of turns in the coil. Adding turns to the coil increases its inductance. Removing turns from the coil decreases its inductance. For a given diameter and length, a single coil needs to have a specified number of turns to provide a desired inductance. When coils are connected in series, the inductances of the individual coils are added together. Thus, for a given inductance, the total number of turns for a single coil will equal the total number of turns for several coils connected in series. For the coils in series, each of the individual coils has fewer turns than the equivalent single coil and therefore less inductance. The lower inductance in each individual coil results in a weaker antenna.

Most antennas used in current asset tracking systems utilize a single coil. The coils come in many shapes and sizes. Some antennas utilize multiple coils to make the antennas tunable to multiple frequency ranges. In current asset tracking systems, these coils are almost always connected in series. In an RFID scenario, the transmitting power of a passive tag is proportional to the power it receives from an RFID reader 106 through the antenna. Poor reception by the receiving antenna may be addressed by delivering more current to the transmitting antenna. The increased current increases the transmission power and therefore increases the power of the signal reflected back from the passive tag. In an ideal environment, the distance that a reader can effectively transmit to a tag and receive from a tag should be equal. However, in most current systems that use a single coil or coils in series, the transmitting distance is much greater than the receiving distance.

The performance of coils connected in parallel is very different from coils connected in series. Instead of adding the inductances of the coils, the overall inductance of parallel coils is calculated by dividing the product of the inductances of the individual coils by the sum of the inductances of the individual coils. This results in a much lower overall inductance value. To increase the total inductance, turns may be added to the individual coils. This results in individual coils with higher inductance and therefore better receiving characteristics. This improvement in reception comes at a cost of a reduction in transmitting power. This is because the power of the coils is directly proportional to the current in each coil. Since the coils are in parallel, the current through the antenna is divided between the coils which results in a smaller transmitting range.

Figure 3A:
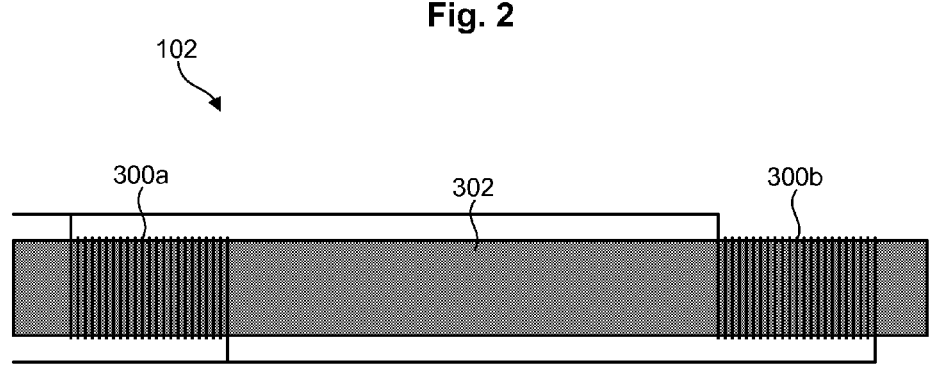
FIG. 3A is a schematic diagram showing one embodiment of an improved antenna in accordance with principles disclosed herein.

FIG. 3A shows one embodiment of an improved antenna in accordance with principles disclosed herein. As shown, dual coils 300a, 300b are wound around an electrically-insulating, magnetically-conductive material 302, in this example a ferrite core 302. The coils 300a, 300b are electrically connected in parallel and physically aligned along a common axis. Such an antenna 102 may detect signals residing in a same plane as the ferrite core 302, which acts to confine and guide magnetic fields.

As shown, the coils 300a 300b are separated by a selected distance along the ferrite core 302. The distance is selected such as to reduce the mutual inductance between the electrically conductive coils 300a, 300b, while allowing the signals from the electrically conductive coils 300a, 300b to add together. In one example, where the coils 300a, 300b are wound around a ferrite core 302 that is one inch in diameter and fifteen inches long, the coils 300a, 300b are separated by approximately ten inches. Other dimensions and separations are possible and within the scope of the disclosure. For example, separations between one centimeter and three feet are possible and within the scope of the disclosure.

The instant inventors have found that the illustrated configuration significantly increases the read range of the antenna 102, perhaps by double in some cases. One antenna used in current Rubee systems includes a fifteen inch long, one inch diameter ferrite core wrapped with a single coil of 28 turns of Litz wire. The turns of the coil are substantially equally spaced along the fifteen inch length of the ferrite core. To test the operation of the improved antenna design, the instant inventors constructed an antenna using dual coils electrically connected in parallel, where each coil consisted of 30 turns of 175 strand, 40 gauge Litz wire to reduce skin effect. The coils were wound around a ferrite core having the same dimensions discussed above. The turns of the individual coils were tightly wound and the coils were separated by a distance of approximately ten inches. When operating at a frequency of 131 kHz with no other changes in the system, the read range of the test antenna was approximately ten feet, which exceeded the read range of the current Rubee antenna by approximately five feet. This was a very significant improvement in terms of read range. The inventors have also tested antennas with more than two parallel coils and have discovered even greater improvements in read range.

Figure 3B:
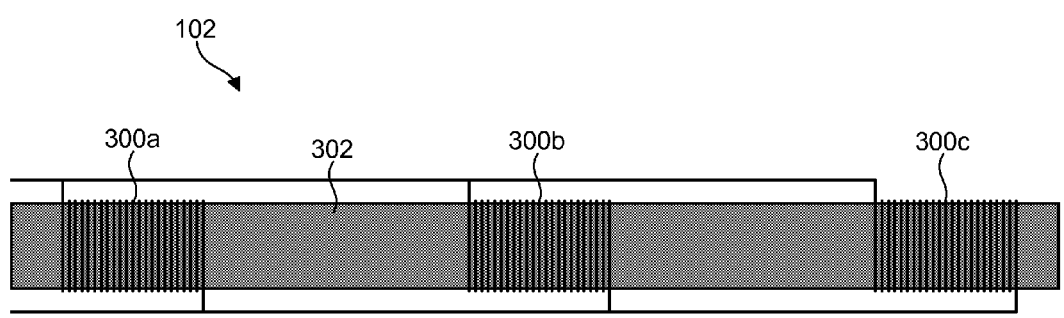
FIG. 3B is a schematic diagram showing another embodiment of an improved antenna in accordance with principles disclosed herein.

As alluded to above, the number of coils used in an improved antenna 102 in accordance with the present disclosure is not limited to two. FIG. 3B shows one embodiment of an antenna 102 using three coils 300a, 300b, 300c electrically connected in parallel and physically aligned along the same axis. Other numbers of parallel coils are possible and within the scope of the present disclosure.

Figure 4A:
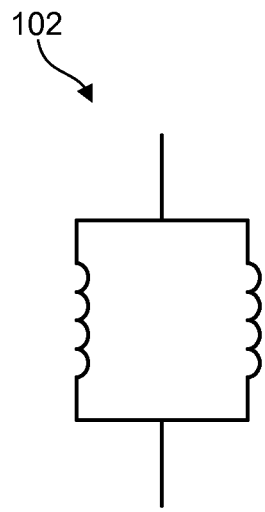
FIGS. 4A through 4D show various different configurations of an improved antenna in accordance with principles disclosed herein.
Figure 4B:
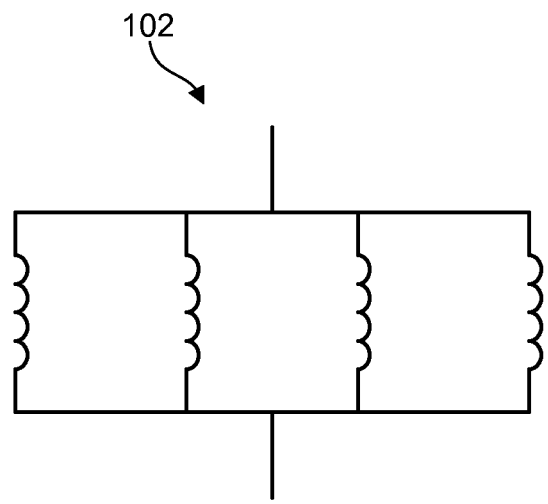
Figure 4C:
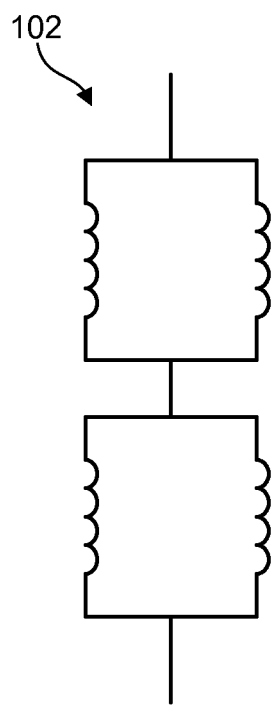

Referring to FIGS. 4A through 4D, parallel coils may be incorporated into various different antenna configurations. FIGS. 4A through 4B show various examples. FIG. 4A shows two coils in parallel and FIG. 4B shows more than two (i.e., four) coils in parallel. FIG. 4C shows two sets of parallel coils arranged in a series configuration. Such an embodiment may be tunable while still providing the greater read range associated with parallel coils. The antenna 102 may be tunable by using a first set of parallel coils for a first frequency range, a second set of parallel coils for a second frequency ranges, or both sets of parallel coils for a third frequency range.

Figure 4D:
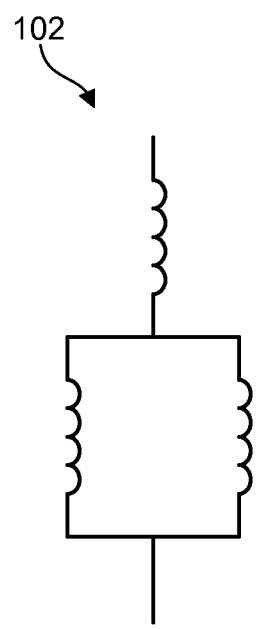

FIG. 4D shows an embodiment where a set of parallel coils is connected in series with a single coil. Such a configuration may optimize an antenna's performance by routing all current through a single coil, thereby providing greater transmitting power, while splitting the current between the parallel coils, thereby providing greater read range as a result of the increased number of turns that are possible in the parallel coils. In other words, the antenna 102 illustrated in FIG. 4D may be optimized for both transmitting and receiving. In this embodiment, the series coil should be placed on a separate piece of ferrite than the parallel coils to reduce mutual inductance between the coils. The distance between the ferrite pieces may vary in accordance with the individual magnetic field strengths.

The embodiments illustrated in FIGS. 4A through 4D are simply examples of various antenna configurations and are not intended to be limiting. Other embodiments or combinations containing the illustrated configurations are possible and within the scope of the disclosure.

Embodiments of the present disclosure may be embodied in other specific forms without departing from its spirit or essential characteristics. The described embodiments are to be considered in all respects only as illustrative and not restrictive. The scope of the disclosure is, therefore, indicated by the appended claims, or claims added to this disclosure at a future point in time, rather than by the foregoing description. All changes which come within the meaning and range of equivalency of the claims are to be embraced within their scope.

What is claimed is:

1. An antenna for use in an asset-identification system, the antenna comprising:
    a first plurality of electrically conductive coils electrically connected in parallel and physically aligned along a common axis, wherein the electrically conductive coils are offset along the common axis by a distance of approximately 10 inches or more, wherein the distance reduces mutual inductance between the electrically conductive coils, while allowing signals from the electrically conductive coils to add together.

2. The antenna of claim 1, further comprising a core around which the first plurality of electrically conductive coils are wound; wherein the core comprises an electrically-insulating, magnetically-conductive material.

3. The antenna of claim 2, wherein the core comprises ferrite.

4. The antenna of claim 2, wherein the core is approximately one inch in diameter and approximately 15 inches in length.

5. The antenna of claim 2, further comprising a single coil connected in series to the first plurality of coils, and wound about a core that is separated from the core about which the first plurality of coils is wound.

6. The antenna of claim 1, further comprising a second plurality of electrically conductive coils electrically connected in parallel and physically aligned along the common axis, wherein each of the coils of the second plurality are offset along the common axis by a distance selected to reduce the mutual inductance between the electrically conductive coils, while allowing the signals from the coils of the second plurality to add together; wherein the coils of the first plurality are connected in series to the coils of the second plurality.

7. The antenna of claim 6, wherein the first plurality of coils are tuned for operation in a first frequency range, and the second plurality of coils are tuned for operation in a second frequency range.

8. The antenna of claim 1, wherein the antenna is tuned for operation in a frequency range centered about 131 kilohertz.

9. The antenna of claim 1, wherein each of the coils comprises from twenty-five to thirty-five equally spaced turns of wire.

10. The antenna of claim 1, wherein the coils provide a range for communication with a tag of at least ten feet.

11. An asset identification system, comprising:
    a reader configured to extract identification information from a signal wirelessly received from an identification tag;

an antenna configured to transmit signals to the passive tag and receive the signal wirelessly transmitted by the identification tag responsive to the transmitted signals;

wherein the antenna comprises:

a first plurality of electrically conductive coils electrically connected in parallel and physically aligned along a common axis, wherein the electrically conductive coils are offset along the common axis by a distance of approximately 10 inches or more, wherein the distance reduces mutual inductance between the electrically conductive coils, while allowing signals from the electrically conductive coils to add together; and an electrically-insulating, magnetically-conductive core about which the first plurality of electrically conductive coils is wound.

12. The system of claim 11, wherein the core comprises ferrite.

13. The system of claim 11, wherein the core is approximately one inch in diameter and approximately 15 inches in length.

14. The system of claim 11, wherein the antenna further comprises a single coil connected in series to the first plurality of coils, and wound about a core that is separated from the core about which the first plurality of coils is wound.

15. The system of claim 11, wherein the antenna further comprises a second plurality of electrically conductive coils electrically connected in parallel and physically aligned along the common axis, wherein each of the coils of the second plurality are offset along the common axis by a distance selected to reduce the mutual inductance between the electrically conductive coils, while allowing the signals from the coils of the second plurality to add together; wherein the coils of the first plurality are connected in series to the coils of the second plurality.

16. The system of claim 15, wherein the first plurality of coils are tuned for operation in a first frequency range, and the second plurality of coils are tuned for operation in a second frequency range.

17. The system of claim 11, wherein the antenna is tuned for operation in a frequency range centered about 131 kilohertz.

18. The system of claim 11, wherein the antenna provides a range for communication with the identification tag of at least ten feet.

19. An antenna for use in an asset-identification system, the antenna comprising:

a plurality of electrically conductive coils electrically connected in parallel and physically aligned along a common axis of a core comprising electrically-insulating, magnetically-conductive material; wherein the antenna is tuned for operation in a frequency range centered about 131 kilohertz.

20. The antenna of claim 19, wherein the coils are offset along the common axis by a distance of approximately 10 inches.

* * * * *